(12) United States Patent
Balakrishnan et al.

(10) Patent No.: US 8,925,050 B2
(45) Date of Patent: Dec. 30, 2014

(54) COMMUNICATION BETWEEN AUTHENTICATION PLUG-INS OF A SINGLE-POINT AUTHENTICATION MANAGER AND CLIENT SYSTEMS

(71) Applicant: Oracle International Corporation, Redwood Shores, CA (US)

(72) Inventors: Aarathi Balakrishnan, Bangalore (IN); Ramya Subramanya, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 129 days.

(21) Appl. No.: 13/663,189

(22) Filed: Oct. 29, 2012

(65) Prior Publication Data

US 2014/0123248 A1 May 1, 2014

(51) Int. Cl.
 *G06F 21/00* (2013.01)
 *G06F 21/31* (2013.01)
(52) U.S. Cl.
 CPC ........................................ *G06F 21/31* (2013.01)
 USPC ................................................................. 726/5
(58) Field of Classification Search
 None
 See application file for complete search history.

(56) References Cited

U.S. PATENT DOCUMENTS

| | | | |
|---|---|---|---|
| 7,752,661 B2 | 7/2010 | Hemsath et al. | |
| 7,809,953 B2 | 10/2010 | Little et al. | |
| 7,886,341 B2 | 2/2011 | Lin et al. | |
| 8,037,295 B2 | 10/2011 | Lin | |
| 2006/0059569 A1* | 3/2006 | Dasgupta et al. | 726/28 |
| 2008/0120715 A1 | 5/2008 | Bhargava et al. | |
| 2009/0150904 A1* | 6/2009 | Champagne et al. | 719/313 |
| 2009/0158392 A1 | 6/2009 | Hughes et al. | |
| 2009/0172792 A1 | 7/2009 | Backhouse | |
| 2010/0037046 A1 | 2/2010 | Ferg et al. | |
| 2011/0047610 A1 | 2/2011 | Mylavarapu et al. | |
| 2013/0183935 A1* | 7/2013 | Holostov et al. | 455/411 |

FOREIGN PATENT DOCUMENTS

EP 1494461 B1 10/2007

OTHER PUBLICATIONS

Wong, et al. "Enabling Secure Communication for a Tivoli Access Manager Session Management Serve Environment", IBM DeveloperWorks, Retrieved from http://www.ibm.com/developerworks/wikis/download/attachments/140051166/Securing+SMS+in+TAM+Environment+V1,pdf?version=1 on Mar. 14, 2012, 40 pages.

* cited by examiner

*Primary Examiner* — Gilberto Barron, Jr.
*Assistant Examiner* — Malcolm Cribbs
(74) *Attorney, Agent, or Firm* — Kilpatrick Townsend & Stockton LLP

(57) ABSTRACT

Various arrangements for providing authentication information to a user are presented. A single-point authentication manager executed by a computer system may receive a request to access a resource from a remote client computer system. The single-point authentication manager may manage access to a plurality of resources including the resource. The single-point authentication manager may communicate with an authentication plug-in application that performs a type of authentication. Authentication of the user may be performed. In response to performing authentication of the user, the authentication plug-in application may generate a message to be transmitted to the remote client computer system. The message may include an indication that the message is to be passed to the remote client computer system and information regarding the authentication of the user. In response to receiving the message from the authentication plug-in application, the message may be transmitted to the remote client computer system.

17 Claims, 8 Drawing Sheets

COMMUNICATION BETWEEN AUTHENTICATION PLUG-INS OF A SINGLE-POINT AUTHENTICATION MANAGER AND CLIENT SYSTEMS

BACKGROUND OF THE INVENTION

When a user is attempting to authenticate with a remote system, such as to access one or more remotely-hosted resources (e.g., applications), the user may be required to provide authentication information, such as a username and password. If the username and password provided is valid, the user may be granted access to use the resources. However, if the username and password provided by the user fails, the user may have little or no visibility into the failure. For example, the user may not know whether the user is inputting an incorrect password or the user's account has been locked. The user may find it useful to receive additional feedback from the remote system as to why the authentication process failed. If an authentication process is successful, the user may find it useful to receive status information about the login process, such as information that indicates how long until the user is required to change his password.

BRIEF SUMMARY OF THE INVENTION

Various arrangements for providing authentication information to a user are presented. A method for providing authentication information to a user may be presented. The method may include receiving, by a single-point authentication manager executed by a computer system, a request to access a resource from a remote client computer system. The single-point authentication manager may manage access to a plurality of resources including the resource. The single-point authentication manager may communicate with an authentication plug-in application that performs a type of authentication. The method may include performing, by the authentication plug-in application, authentication of the user. The method may include, in response to performing authentication of the user, creating, by the authentication plug-in application, a message to be transmitted to the remote client computer system. The message may include an indication that the message is to be passed to the remote client computer system. The message may include information regarding the authentication of the user. The method may include in response to receiving the message from the authentication plug-in application, transmitting the message to the remote client computer system.

Various embodiments of such a method may include one or more of the following: The information regarding the authentication of the user may include status information of an authentication process, wherein the authentication process failed. The information regarding the authentication of the user may include status information about an authentication process, wherein the authentication process is successful. The method may include executing the resource remote from the remote client computer system. The method may include determining, by the authentication plug-in application, a credential collector is communication with the single-point authentication manager from within a single domain. Based on determining the credential collector is communicating with the single-point authentication manager from within the single domain, an http forward operation may be used for transmitting the message to the remote client computer system, via the credential collector. The method may include determining, by the authentication plug-in application, a credential collector is communicating with the single-point authentication manager from a separate domain. Based on determining the credential collector is communicating with the single-point authentication manager from the separate domain, an http redirect operation may be used for transmitting the message to the remote client computer system via the credential collector. The method may include determining, by the single-point authentication manager executed by the computer system, the authentication plug-in application is to be used to authenticate the request received from a client. The message may be presented to the user via a web browser at the remote client computer system.

In some embodiments, a computer program product residing on a non-transitory computer-readable medium for providing authentication information to a user is presented. The computer program product may comprise computer-readable instructions configured to cause a computer to receive a request to access a resource from a remote client computer system. The computer program product may comprise a single-point authentication manager that receives the request manages access to a plurality of resources including the resource. The single-point authentication manager may communicate with an authentication plug-in application that performs a type of authentication. The computer program product may comprise computer-readable instructions configured to cause the computer to perform, using the authentication plug-in application, authentication of the user. The computer program product may comprise computer-readable instructions configured to cause the computer to, in response to performing authentication of the user, create, using the authentication plug-in application, a message to be transmitted to the remote client computer system. The message may include an indication that the message is to be passed to the remote client computer system. The message may include information regarding the authentication of the user. The computer program product may comprise computer-readable instructions configured to cause the computer to, in response to receiving the message from the authentication plug-in application, cause the message to be transmitted to the remote client computer system.

Embodiments of such a computer program product may include one or more of the following: The information regarding the authentication of the user may include status information of an authentication process, wherein the authentication process failed. The information regarding the authentication of the user may include status information about an authentication process, wherein the authentication process is successful. The computer program product may further include computer-readable instructions configured to cause the computer to determine a credential collector is communicating with the single-point authentication manager from within a single domain. Based on determining the credential collector is communicating with the single-point authentication manager from within the single domain, an http forward operation may be used for transmitting the message to the remote client computer system, via the credential collector. The computer program product may further include computer-readable instructions configured to cause the computer to determine a credential collector is communicating with the single-point authentication manager from a separate domain. Based on determining the credential collector is communicating with the single-point authentication manager from the separate domain, an http redirect operation may be used for transmitting the message to the remote client computer system via the credential collector. The computer program product further comprising computer-readable instructions configured to cause the computer to determine the authentication plug-in application is to be used to authenticate the request received from a client. The message may be presented to the user via a web browser at the remote client computer system.

In some embodiments, a system for providing authentication information to a user may be presented. The system may include a single-point authentication computer system. The single-point authentication computer system may include a processor. The single-point authentication computer system may include a memory communicatively coupled with and readable by the processor and having stored therein processor-readable instructions. When the processor-readable instructions are executed by the processor, the processor-readable instructions may cause the processor to receive, by a single-point authentication manager executed by the single-point authentication computer system, a request to access a resource from a remote client computer system. The single-point authentication manager may manage access to a plurality of resources including the resource. The single-point authentication manager may communicate with an authentication plug-in application that performs a type of authentication. When the processor-readable instructions are executed by the processor, the processor-readable instructions may cause the processor to perform by the authentication plug-in application, authentication of the user. When the processor-readable instructions are executed by the processor, the processor-readable instructions may cause the processor to, in response to performing authentication of the user, creating, by the authentication plug-in application, a message to be transmitted to the remote client computer system. The message may include an indication that the message is to be passed to the remote client computer system. The message may include information regarding the authentication of the user. When the processor-readable instructions are executed by the processor, the processor-readable instructions may cause the processor to, in response to receiving the message from the authentication plug-in application, cause the message to be transmitted to the remote client computer system.

Embodiments of such a system may include one or more of the following: The information regarding the authentication of the user may include status information of an authentication process, wherein the authentication process failed. The information regarding the authentication of the user may include status information about an authentication process, wherein the authentication process is successful. The processor-readable instructions of the single-point authentication computer system which, when executed by the processor, may further cause the processor to determine a credential collector is communicating with the single-point authentication manager from within a single domain. Based on determining the credential collector is communicating with the single-point authentication manager from within the single domain, an http forward operation may be used for transmitting the message to the remote client computer system, via the credential collector. The processor-readable instructions of the single-point authentication computer system which, when executed by the processor, may further cause the processor to determine a credential collector is communicating with the single-point authentication manager from a separate domain. Based on determining the credential collector is communicating with the single-point authentication manager from the separate domain, an http redirect operation may be used for transmitting the message to the remote client computer system via the credential collector.

DETAILED DESCRIPTION OF THE INVENTION

Figure 1:
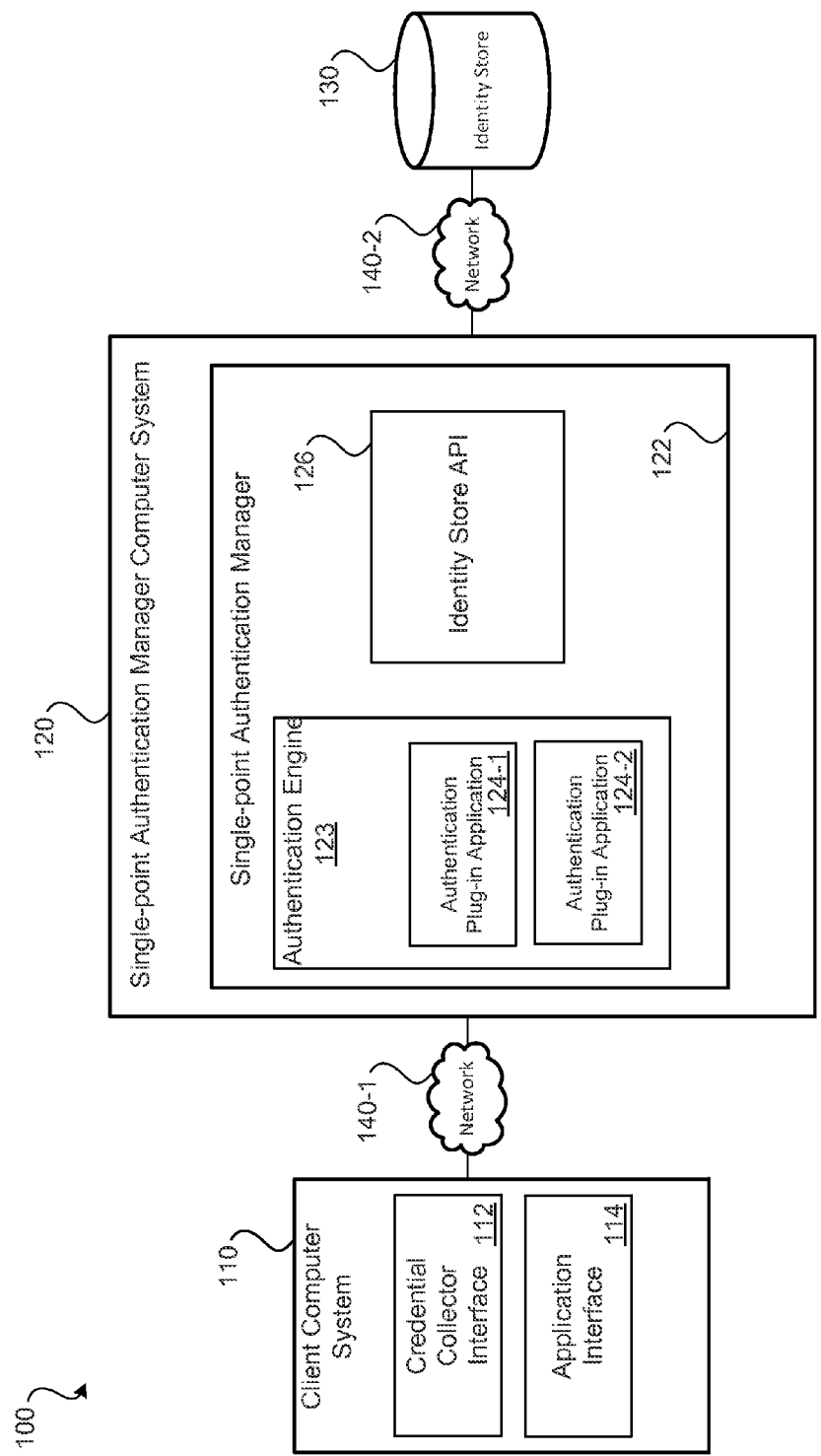
FIG. 1 illustrates an embodiment of a system for authenticating a user and presenting authentication information to the user.

A single-point authentication manager may be used to control access to one or more applications that are executed remotely from client computer systems. A user may use a client computer system to access the one or more applications that are executed remotely. In order to access the one or more applications, it may be necessary for the user to be authenticated. For each of the applications, authentication may be performed via the single-point authentication manager. While the single-point authentication manager may handle authentication, one or more other computer systems may handle execution of the one or more applications.

Depending on the type of authentication that is desired to be performed, various different authentication plug-in applications may be used in conjunction with the single-point authentication manager. For instance, one authentication plug-in may handle username/password authentication. The single-point authentication manager may communicate with each authentication plug-in. A business entity such as a corporation, may implement a customized authentication plug-in to perform specific authentication functionality desired by the business entity.

In some instances, it may be desirable for an authentication plug-in to be able to pass information to the user of the client computer system. For instance, if authentication fails, rather than the single-point authentication manager returning a generic message to the user via the client computer system (such as "login failed"), a useful message may be passed from the authentication plug-in through the single-point authentication manager to the user via the client computer system. For instance, a more detailed message in response to a failed authentication may be "Your account has been locked, please call 888.555.4278 for assistance."

In addition to situations where authentication fails, when authentication is successful it may be desirable to at least occasionally pass information to the user by the authentication plug-in. As an example of this, the user may be alerted that the user's password will expire in some amount of days by an authentication plug-in. Accordingly, a message stating as such may be passed from the authentication plug-in through the single-point authentication manager to the user via the client computer system.

Additionally, the ability of an authentication plug-in to use HTTP forward and redirect operations may be a configurable parameter of the plug-in. If the client computer system being used by the user is within a same domain of the single-point authentication manager, a forward operation may be used to transmit a message from the authentication plug-in to the client computer system. If the client computer system being used by the user outside the domain of the single-point authentication manager, a redirect operation may be used to transmit the message from the authentication plug-in to the client computer system. Accordingly, a single plug-in that is configured to handle both clients within and outside of the same domain may not require any modified code or a redeployment.

FIG. 1 illustrates an embodiment of a system 100 for authenticating a user and presenting authentication information to the user. System 100 may include client computer system 110, single-point access manager computer system 120 that is executing single-point access manager 122, identity store 130, and networks 140.

Client computer system 110 may represent a computer system remote from single-point access manager computer system 120. Single-point access manager computer system 120 may be an ORACLE Access Manager (OAM) server, or some other server system configured to perform authentication services for access to multiple applications that are remotely-executed from client computer systems. Client computer system 110 may be operated by a user that is attempting to access one or more applications that are executed remotely. Access to these one or more applications may be controlled by single-point access manager 122 executed by single-point access manager computer system 120. Information may be presented to the user via a web browser being executed by client computer system 110 or some other form of interface for presenting information from single-point access manager 122.

Credential collector interface 112 may be presented to a user via a web browser of client computer system 110. Credential collector interface 112 may be used to collect data for a credential collector from the user that will be used by single-point access manager 122 and one or more authentication plug-in applications 124 to authenticate the user of client computer system 110. Credential collector interface 112 may communicate with a credential collector being executed by single-point access manager computer system 120 or may be redirected from some other computer system separate from single-point access manager computer system 120. Credential collector interface 112 may be presented by web browser. Credential collector interface 112 may, for example, request a username and password from the user of client computer system 110. Credential collector interface 112 may also request additional or alternate information from the user, such as a voice sample, a digital certificate, a fingerprint, a retina scan, some other form of biometric input, and/or generally, some other form of data that may be used to authenticate the user.

Following a successful authentication, client computer system may present application interface 114 to the user. Application interface 114 may be used for access to an application, which may be executed remotely from client computer system 110, to which access was requested by the user. The application may be executed locally by client computer system 110 or remotely by some other computer system. In some embodiments, application interface 114 is presented within a web browser to a user via client computer system 110. Whether executed locally or remotely, access to the application of application interface 114 may be controlled by single-point access manager 122 executed by single-point access manager computer system 120.

Communication between client computer system 110 and single-point access manager computer system 120 may be performed via one or more networks. Network 140-1 may represent one or more networks, including private and/or public networks. An example of a public network may be the Internet. An example of a private network may be a corporate intranet.

Single-point access manager computer system 120 may execute a single-point access manager, such as single-point access manager 122. Single-point access manager 122 may include several components, such as authentication engine 123 and identity store application programming interface (API) 126. Single-point access manager 122 may be configured to control access to one or more resources, such as applications, which may be executed remotely from client computer systems. As such, single-point access manager 122 may control access to multiple applications for multiple users accessing the applications from multiple client computer systems. For simplicity, in FIG. 1, a single client computer system 110 is shown in communication with single-point access manager computer system 120. It should be understood that in other embodiments, many client computer systems may be accessing single-point access manager computer system 120 simultaneously. The applications to which access is controlled by single-point access manager 122 may be executed by one or more other computer systems. As such, following successful authentication, single point access manager 122 may hand off the authenticated user to the computer system hosting the requested application.

Single-point access manager 122 that is being executed by single-point access manager computer system 120 may be configured to perform various types of authentication including authentication that is customized for a particular customer. Single-point access manager 122 may represent an ORACLE Access Manager (OAM) or some other authentication application that is configured to control access to multiple applications that are remotely executed from client computer systems. As an example of one such arrangement that may be used, a customer, such as a business entity that desires to control access to multiple applications by its employees, may have a specific type of authentication it desires to use to control access to the applications. Depending on the type of authentication desired, various authentication plug-in applications may be used in conjunction with authentication engine 123 of single-point access manager 122 in order to perform authentication of users.

As an example of the customization possible with authentication engine 123, if a customer desires username and password authentication of its users, a username/password authentication plug-in application may be used in conjunction with single-point access manager 122 in order to enable such a form of authentication. In system 100, authentication plug-in application 124-1 may represent a username/password authentication plug-in application. Authentication plug-in application 124-1 may communicate with identity store API 126. Identity store API 126 may be configured to access one or more identity stores, such as identity store 130, in order to retrieve the data necessary to authenticate a user. Some examples of customized authentication plug-ins include plug-ins that perform authentication based on fingerprints, retina scans, or some other form of biometric input. Another example may be a plug-in that authenticates based on an RSA SecureID.

Authentication plug-in application 124-2 may be used to perform some other form of authentication different than authentication plug-in application 124-1. Which authentication plug-in application is used for authentication of the user may be based on the resource attempting to be accessed by the user via client computer system 110. Other factors may also determine which authentication plug-in application is used, such as the identity of the user, and/or whether the client computer system 110 is located within or outside the domain of single-point access manager computer system 120. In some instances, multiple authentication plug-in applications may be used to authenticate a user. Further, it should be understood that in other embodiments, single-point access manager 122 may have fewer or greater numbers of installed authentication plug-in applications that are used for performing authentication.

Identity store API 126 may be configured to interface with one or more identity stores, such as identity store 130. Identity store API 126 may be configured to retrieve username and/or password information from identity store 130 in order to authenticate a user. Identity store API 126 may also be configured to retrieve other identity information besides username and password data from identity store 130. For example, identity store 130 may store information such as: voice samples, user digital certificates, fingerprint data, retina scan data, some other form of biometric input, and/or generally, some other form of data that may be used to authenticate the user. Identity store 130 may be in the form of an active directory. Identity store 130 may be hosted by single-point access manager computer system 120 or some other computer system or storage system remote from single-point access manager computer system 120.

Communication between single-point access manager computer system 120 and identity store 130 may use network 140-2. Network 140-2 may represent one or more networks, including private and/or public networks. An example of a public network may be the Internet. An example of a private network may be a corporate intranet. Network 140-2 may represent the same network or a different network from network 140-1.

Each of authentication plug-in applications 124 may be able to pass information to a user via a credential collector (which presents credential collector interface 112) and/or application (which presents application interface 114). An authentication plug-in application, such as authentication plug-in application 124-1, may pass information to a credential collector via single-point access manager 122 to provide a user with information when authentication fails. In such an arrangement, a user may have submitted credentials to single-point access manager 122 via credential collector interface 112 to a credential collector and network 140-1. Using the credentials submitted by the user, authentication plug-in application 124-1 may have attempted to authenticate the user. This may involve having identity store API 126 retrieve data corresponding to the user from identity store 130 via network 140-2. If the authentication fails, authentication plug-in application 124-1 may be configured to pass information to the user via single-point access manager 122, network 140-1, and the credential collector to provide the user with information as to the authentication failure.

To provide the user with information regarding a failed authentication, authentication plug-in application 124-1 may use a request parameter that is in the format of <name=value> to give details about the authentication failure. As example, the request parameter that is passed by authentication plug-in application 124-1 to single-point access manager 122 may be "plugin_error_response." When single-point access manager 122 receives such a parameter from authentication plug-in application 124-1, single-point access manager 122 may be configured to pass the parameter to the credential collector providing credential collector interface 112 of client computer system 110. Single-point access manager 122, in some embodiments, uses the value of the parameter output by the authentication plug-in application to create a message that will be properly displayed to the user by client computer system 110 and credential collector interface 112.

If authentication by authentication plug-in application 124-1 has succeeded, application interface 114 may be presented to the user for use via client computer system 110. As such, credential collector interface 112 may no longer be presented to the user. Rather application interface 114 may be presented to the user via a web browser or some other presentation arrangement. Application interface 114 may be associated with an application executed remote from client computer system 110. Despite authentication being successful, authentication plug-in application 124-1 may have information that is to be passed to the user via single-point access manager 122, network 140-1, client computer system 110, and the application and application interface 114. To pass information to the user, authentication plug-in application 124-1 may use a request parameter that is in the format of <name=value> to give details about authentication. As example, the request parameter that is passed by authentication plug-in application 124-1 to single-point access manager 122 may be "plugin_client_response." When single-point access manager 122 receives such a parameter from authentication plug-in application 124-1, single-point access manager 122 may be configured to pass the value of the parameter to the application associated with application interface 114 being presented by client computer system 110. Single-point access manager 122, in some embodiments, uses the value of the parameter output by the authentication plug-in application to create a message that will be displayed to the user by client computer system 110 and application interface 114. As an example of information that may be useful for an authentication plug-in application to communicate to the user when authentication is successful may be information regarding when the user will be required to update his or her password. Other examples may be information about the strength of the user's password, changes in password policy, etc.

It should be understood that while in system 100 of FIG. 1, one single-point access manager computer system 120 is illustrated, it should be understood that similar functions may be performed by multiple computers operating in a distributed computing environment. As such, various functions of single-point access manager 122 may be performed by different computer systems.

Figure 2:
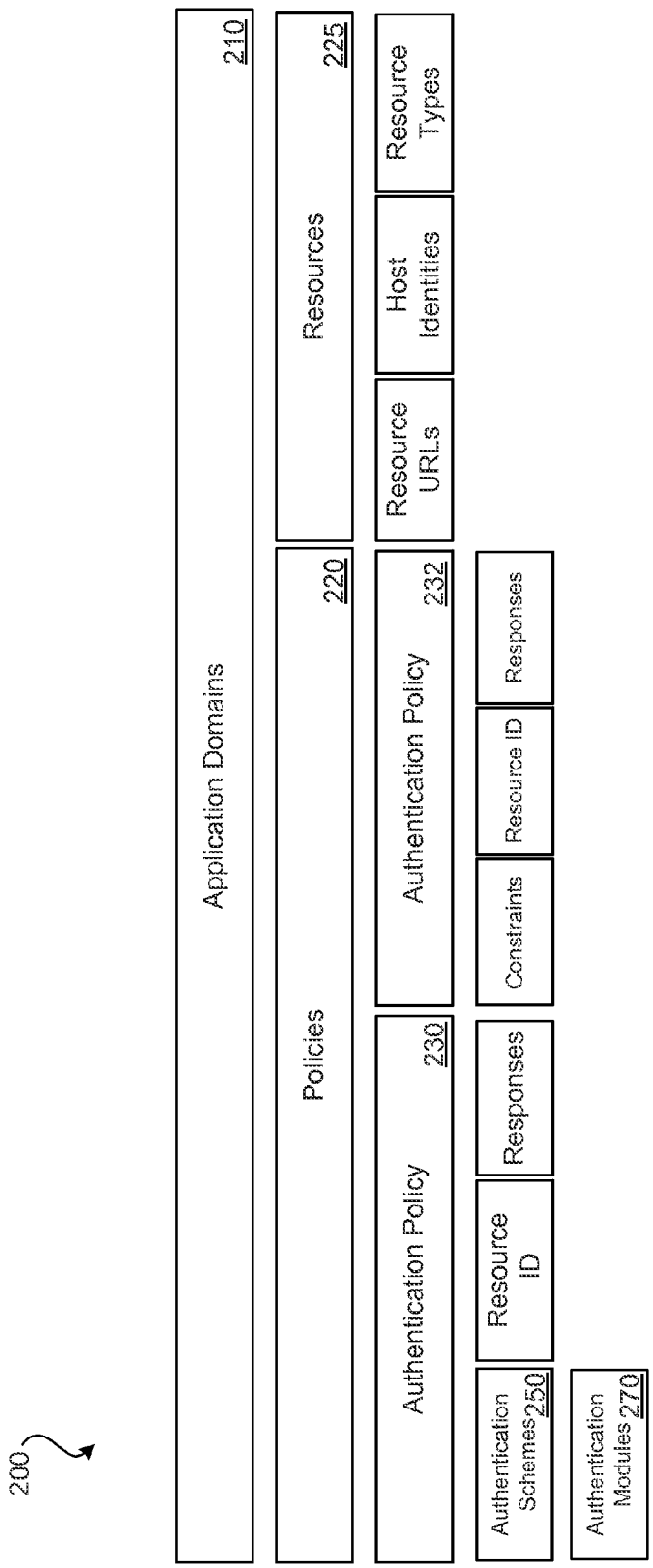
FIG. 2 illustrates an embodiment of an authentication scheme.

Various authentication schemes may be used by a system for authenticating a user and presenting authentication information to the user. FIG. 2 illustrates an embodiment of an authentication scheme 200. Authentication scheme 200 illustrates an example of how single-point access manager 122 of system 100 of FIG. 1 may use authentication plug-in applications to enforce an authentication scheme.

Application domains 210 may contain each of the resources to which single-point access manager 122 is being used to control access. An application domain may be defined for one or more applications to which access is desired to be controlled by a single-point access manager. Such applications may be referred to as resources 225. Policies 220 may be linked to specific resources 225. As such, a particular policy that defines an authentication process may correspond to a particular one or more applications of resources 225. Within policies 220 may be one or more authentication policies. In the embodiment of FIG. 2, two authentication policies are illustrated: authentication policy 230 and authentication policy 232. Authentication policy 230 may correspond upon to one or more different resources of resources 225 from authentication policy 232.

For each authentication policy, such as authentication policy 230, one or more authentication schemes may be used.

An authentication scheme may be a shared component that can be reused across multiple authentication policies. As such, a particular authentication scheme may be used by both authentication policy 230 and authentication policy 232. Within authentication schemes, such as authentication schemes 250, one or more authentication modules, such as authentication modules 270, may be present. An authentication module may be defined as the smallest executable unit of an authentication scheme. As illustrated in system 100 of FIG. 1, authentication modules 270 are present in the form of authentication plug-in application 124-1 and authentication plug-in application 124-2. A single-point access manager may permit for use of authentication modules provided with the single-point access manager and custom authentication modules. As such, an authentication plug-in application may be provided as part of single-point access manager 122 of FIG. 1 or may be customized for a particular business entity.

Based on the environment of the credential collector associated with credential collector interface 112 and the application associated with application interface 114, the operation used to send data from an authentication plug-in, such as authentication plug-in application 124-1, to either the credential collector or the application may vary. While an interface, such as via a web browser, presents information in credential collector interface from a credential collector and application interface 114 from an application to the user via client computer system 110, the credential collector and/or the application may be executed by a remote computer system, such as single-point access manager computer system 120 or some other computer system (not illustrated). Depending on whether single-point access manager computer system 120 or some other computer system is used for execution of the credential collector or the application, either a forward or redirect operation may be used.

Figure 3A:
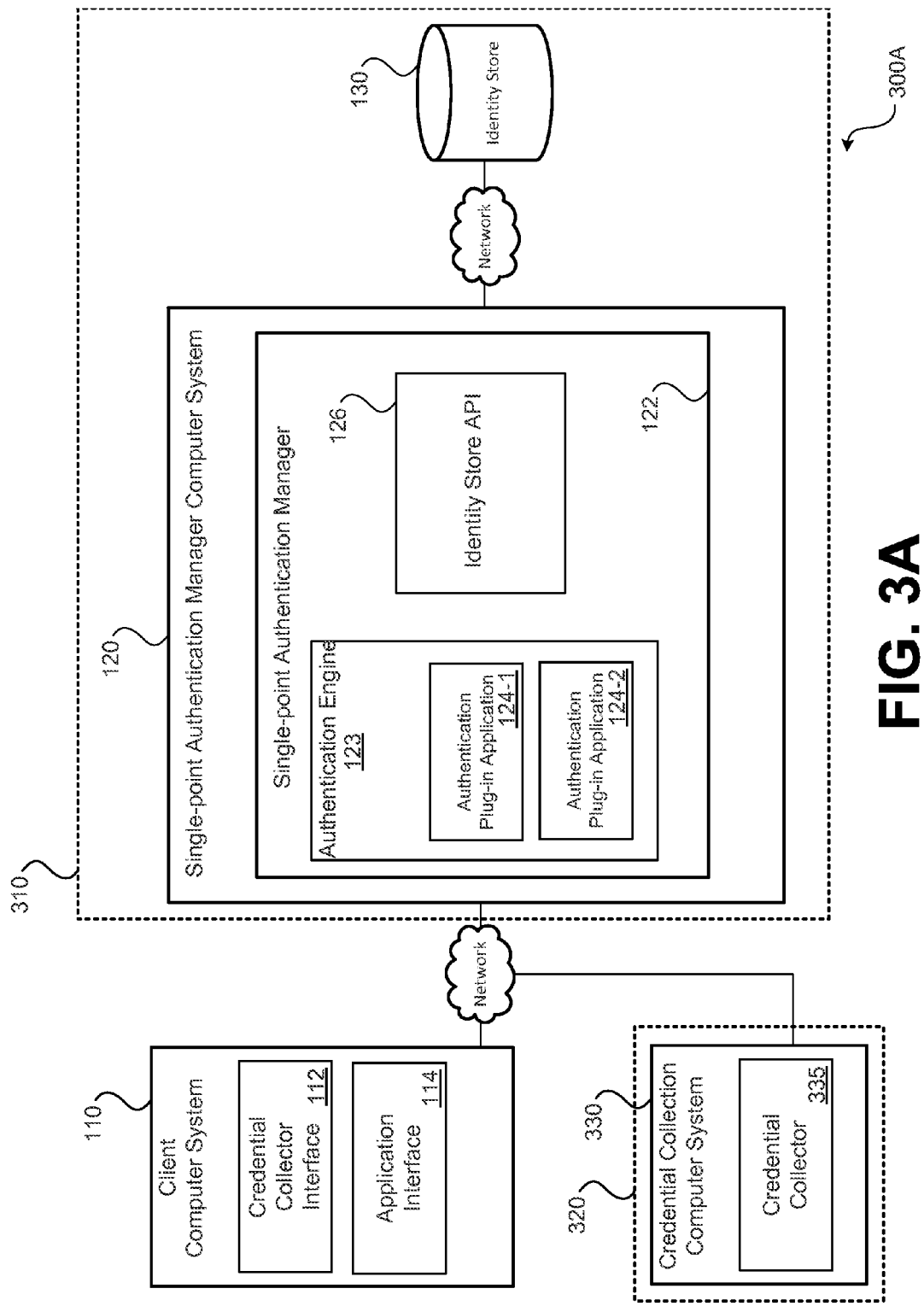
FIG. 3A illustrates an embodiment of a system for authenticating a user in a different domain and presenting authentication information to the user.

For example, in some situations, an HTTP forward operation may be used to send data from an authentication plug-in application to a credential collector (if the credential collector associated with credential collector interface 112 is deployed within single-point access manager computer system 120); in other situations, an HTTP redirect operation may be used to send data from an authentication plug-in application to the credential collector associated with credential collector interface 112 (if the credential collector associated with credential collector interface 112 is deployed outside single-point access manager computer system 120, such as on a separate computer system accessible via a different IP address). FIG. 3A illustrates an embodiment of a system 300A for authenticating a user in which the credential collector is executed in a different domain from the single-point authentication manager computer system and presenting authentication information to the user. System 300A may represent system 100 of FIG. 1 or some other system configured to authenticate a user and present authentication information to the user.

In system 300A, single-point access manager computer system 120 and credential collection computer system 330 (which executes credential collector 335 associated with credential collector interface 112) are located in different domains. As an example of when such an arrangement may occur, it may be desired that the credential collector be executed by a separate computer system from single-point access manager computer system 120: for example, security concerns of having a custom application operating on the same server as the single-point authentication may exist. Credential collection computer system 330 is located in domain 320. Single-point access manager computer system 120 is located in domain 310. When information is transmitted from an authentication plug-in, such as authentication plug-in application 124-1, to either credential collector 335 or an application, which may be executed by another computer system in a separate domain (not pictured), an HTTP redirect may be used for sending the information regarding authentication information to credential collector 335 or the application. An authentication plug-in application may have a configuration parameter that defines whether a forward or redirect operation is to be used for transmitting data from the authentication plug-in application via single-point access manager 122, network 140-1, to credential collector 335 or an application. Since a configuration parameter of the authentication plug-in application defines whether a HTTP redirect is used, the authentication plug-in application may set the parameter based on whether the credential collector is within or outside of the domain of single-point access manager computer system 120. Based on this parameter, the same plug-in application may be used for situations when domain 320 is separate from domain 310 and when domain 320 is the same as domain 310 (e.g., credential collector 335 is being executed by single-point access manager computer system 120).

Figure 3B:
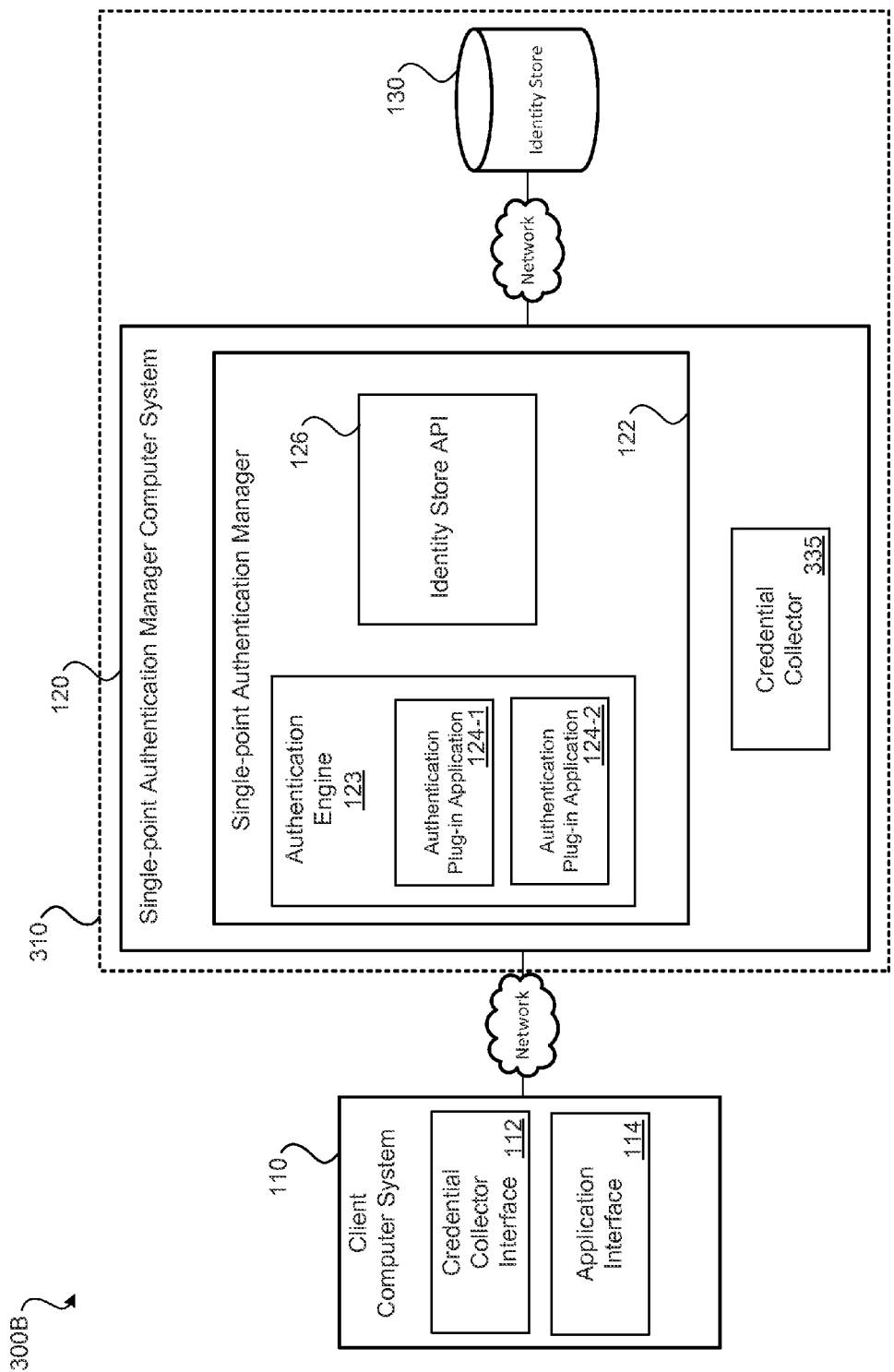
FIG. 3B illustrates an embodiment of a system for authenticating a user in a single domain and presenting authentication information to the user.

FIG. 3B illustrates an embodiment of a system 300B for authenticating a user when the credential collector 335 is in the domain of single-point access manager computer system 120. System 300B may represent system 100 of FIG. 1 or some other system configured to authenticate a user and present authentication information to the user. In system 300B, single-point access manager computer system 120 and credential collector 335 (which presents credential collector interface 112 at client computer system 110) are located in the same domain 310 (e.g., both are executed by the same computer system). When information is transmitted from an authentication plug-in, such as authentication plug-in application 124-1, to credential collector 335 (or an application being executed by single-point access manager computer system 120), an HTTP forward may be used for sending the information regarding either the successful or unsuccessful authentication attempt to credential collector 335 (or the application). An authentication plug-in application may have a configuration parameter that defines whether a forward or redirect operation is used for transmitting data from an authentication plug-in application via single-point access manager 122 to credential collector 335 (or an application). Since a configuration parameter of an authentication plug-in application defines whether a HTTP redirect or forward operation is used, the parameter of the authentication plug-in application may set based on whether the credential collector 335 is within the domain of single-point access manager computer system 120. Based on this parameter, the same plug-in application may be used for both situations when credential collector 335 is outside domain 310 and when credential collector 335 is within domain 310. As such, authentication plug-in application 124-1 in systems 300A and 300B may use both forward and redirect operations based on the environment of the credential collector (such as inside or outside the domain of single-point access manager computer system 120). An authentication plug-in application may be able to determine the environment of credential collector 335 based on information present in a request for authentication from the client computer system.

Figure 4:
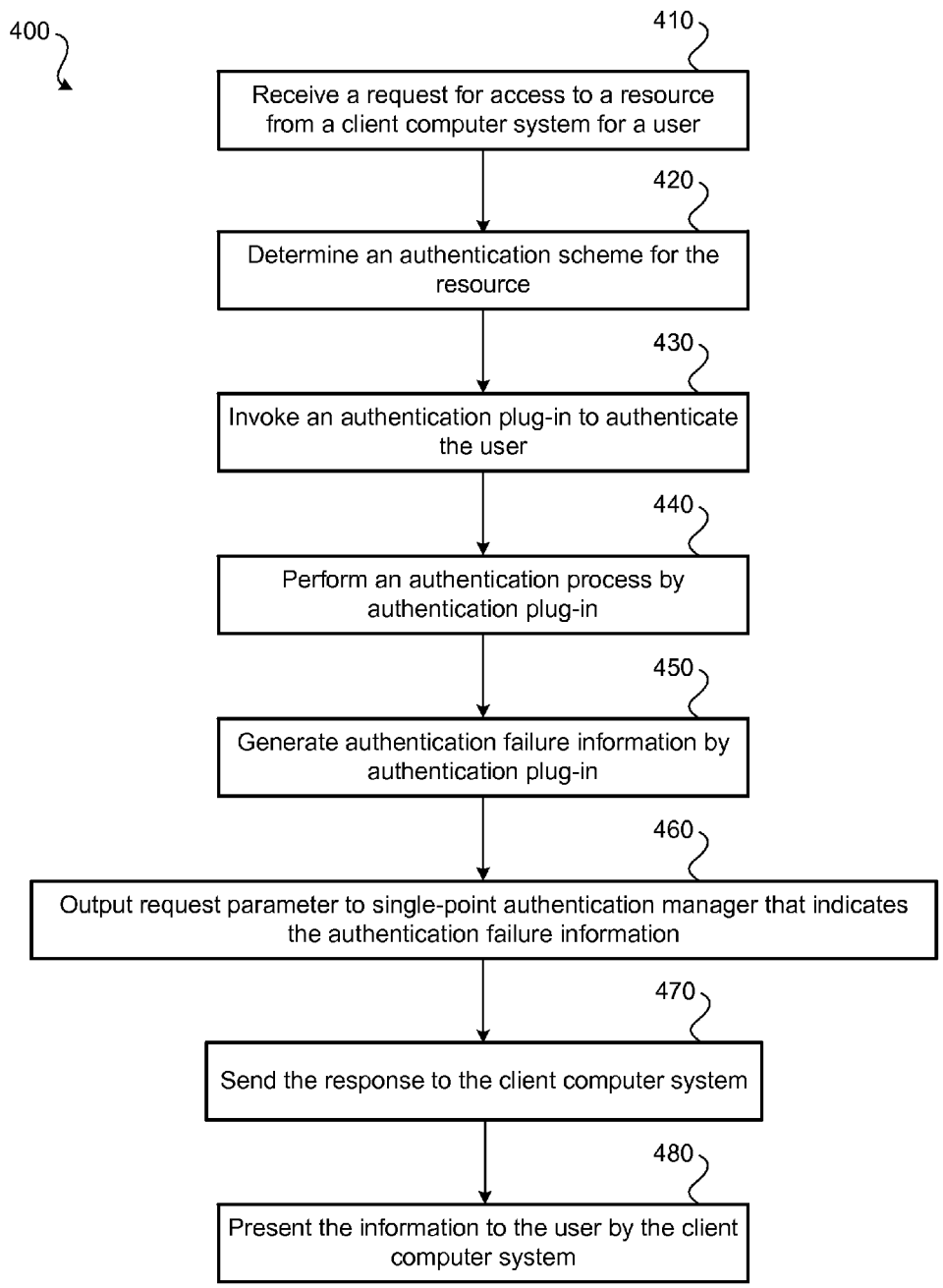
FIG. 4 illustrates an embodiment of a method for presenting authentication information to the user.

Various methods may be performed using the systems of FIGS. 1, 3A, and 3B. FIG. 4 illustrates an embodiment of a method 400 for presenting information related to a failed authentication to the user attempting to be authenticated. Method 400 may be performed by system 100 of FIG. 1, system 300A of FIG. 3A, system 300B of FIG. 3B or some other system configured to perform single-point authentication information for the user. Means for performing method 400 include computer systems, such as computer system 700 of FIG. 7. More specifically, means for performing method 400 may include a client computer system, one or more networks, one or more single-point access manager computer systems, one or more computer systems executing a credential collector, and/or one or more identity stores.

At step 410, a request for access to a resource, such as an application, may be received from a client computer system for a user. The request may be received by a single-point access manager. Such a single-point access manager may provide authentication services for one or more applications which are executed remotely from the client computer system being used by the user to access the resource. The request for access to the resource may include credentials submitted via a credential collector interface that communicates with a remotely-executed credential collector. The credential collector interface may be presented to the user via web browser. As an example of a credential collector interface, a webpage may be presented to the user that requests a username and password. Various forms of credentials that may be submitted by a user include, but are not limited to: a user name, a password, a biometric sample (e.g., a fingerprint, voiceprint, retina scan, etc.), a digital certificate, or other various types of information that may be used for authentication. Successful authentication may be required for the user to access the resource that the user has requested.

At step 420, it may be determined, such as by the single-point access manager, which authentication scheme (possibly selected from a plurality of authentication schemes) is associated with the resource being requested by the user. Such a determination may be at least partially based on the request received at step 410 for access to the resource. Referring to FIG. 2, an authentication policy, such as authentication policy 230, may be associated with a particular resource (such as an application) of resources 225. Based on this authentication policy, various authentication modules, which may be authentication plug-in applications, may be invoked. Accordingly, for the resource requested at step 410, one or more particular authentication plug-in applications may be invoked to authenticate the user's access to the requested resource. In some embodiments, credentials are only requested from a user after the authentication scheme has been requested at step 420. In such embodiments, as part of step 420, data may be transmitted to the client computer system to request particular credentials from the user, such as a username and password, from the user. The requested credentials may be received by the single-point access manager from the user via the client computer system.

At step 430, at least one authentication plug-in application may be invoked for use in authenticating the user. Referring to system 100 of FIG. 1, an authentication plug-in application, such as authentication plug-in application 124-1, may be invoked by single-point access manager 122 which is being executed by single-point access manager computer system 120. Authentication plug-in application 124-1 may have been previous installed as a software component to add specific authentication abilities to the single-point authentication manager. Authentication of the credentials submitted by the user via credential collector interface 112 and client computer system 110 may be performed using authentication plug-in application 124-1. For example, authentication plug-in application 124-1 may be installed to handle a specific type of username and password authentication.

At step 440, the authentication plug-in application may perform authentication of the user using the credentials submitted by the user at either step 410 or step 420. The authentication plug-in application performing authentication may involve using an identity store API of the single-point access manager to retrieve stored identity information from either a local or remote identity store for comparison with the received credentials. For example, if the credentials submitted by the user are a username and password, a stored password associated with the username may be retrieved from the identity store for comparison with the password received from the user. For the purposes of method 400, it is assumed that authentication by the authentication plug-in application fails. For example, authentication may fail if: the password submitted by the user is incorrect, the user's account has been locked or otherwise disabled, the users password has expired, too many attempts have been made for access by the users account, the user's account is associated with another active session, or the credentials submitted by the user are otherwise invalid.

At step 450, the authentication plug-in application through which authentication failed may generate authentication failure information that is to be passed to the user. Such information may be useful to the user in order to remedy why authentication failed. The authentication failure information generated at step 450 may indicate the reason for the authentication failure and/or steps for the user to remedy the authentication failure. By way of example only, sample authentication failure information may be a string of text that states: "Your account has been locked due to submission of too many incorrect password attempts, please contact your system administrator at 978.555.6134 to unlock your account." The authentication failure information provided by the authentication plug-in application may be customized for the authentication plug-in application and/or the business entity on whose behalf the authentication plug-in application is being executed. The authentication failure information generated at step 450 may be in the format of <name=value>. The parameter may be "plugin_error_response." As such, referring back to the previous example, a request parameter such as PLUGIN_ERROR_RESPONSE="Your account has been locked due to submission of too many incorrect password attempts, please contact your system administrator at 303.555.6134 to unlock your account" may be generated by the authentication plug-in application. At step 460, the request parameter generated at step 450 may be output by the authentication plug-in application to the single-point access manager. Referring to system 100 of FIG. 1, for example, authentication plug-in application 124-1 may pass a request parameter of "plugin_error response" to single-point access manager 122.

At step 470, the single-point access manager may receive the request parameter from the authentication plug-in application. Based on the name of the request parameter, such as "plugin_error_response," the single-point access manager may perform little or no processing on the request parameter. Rather the single-point access manager may be configured such that based on the name of the request parameter, the request parameter is passed to the credential collector and then on to the credential collector interface being presented via the client computer system. Accordingly, by an authentication plug-in application using such a request parameter, information may be passed from the authentication plug-in application to a user, via a credential collector and credential collector interface, client computer system, network, and single-point access manager. Therefore, at step 470, the request parameter may be transmitted by the single-point access manager to the credential collector interface of the client computer system as an HTTP request parameter for display or for some other form of presentation to the user. The webgate which is the filter that the single-point access manager uses to authenticate users, redirects the user to an URL of the resource when the authentication is complete. The URL used to access the single-point access manager and all the request parameters associated with this URL may be discarded after the authentication is complete. "Plugin_client_response" is intended to be consumed by the client application, therefore any values to be passed to the client application may need to be set in the HTTP header.

At step 480, the content of the request parameter, such as the value, may be presented by the credential collector and credential collector interface. By presenting the value of the request parameter, the user may be able to view the information output by the authentication plug-in application. As such, referring to the previous example, the user may see the message: "Your account has been locked due to submission of too many incorrect password attempts, please contact your system administrator at 303.555.6134 to unlock your account." If the credential collector interface is presented by the client computer system via a web browser, the web browser may be used to present the information contained within the request parameter generated by the authentication plug-in application.

Figure 5:
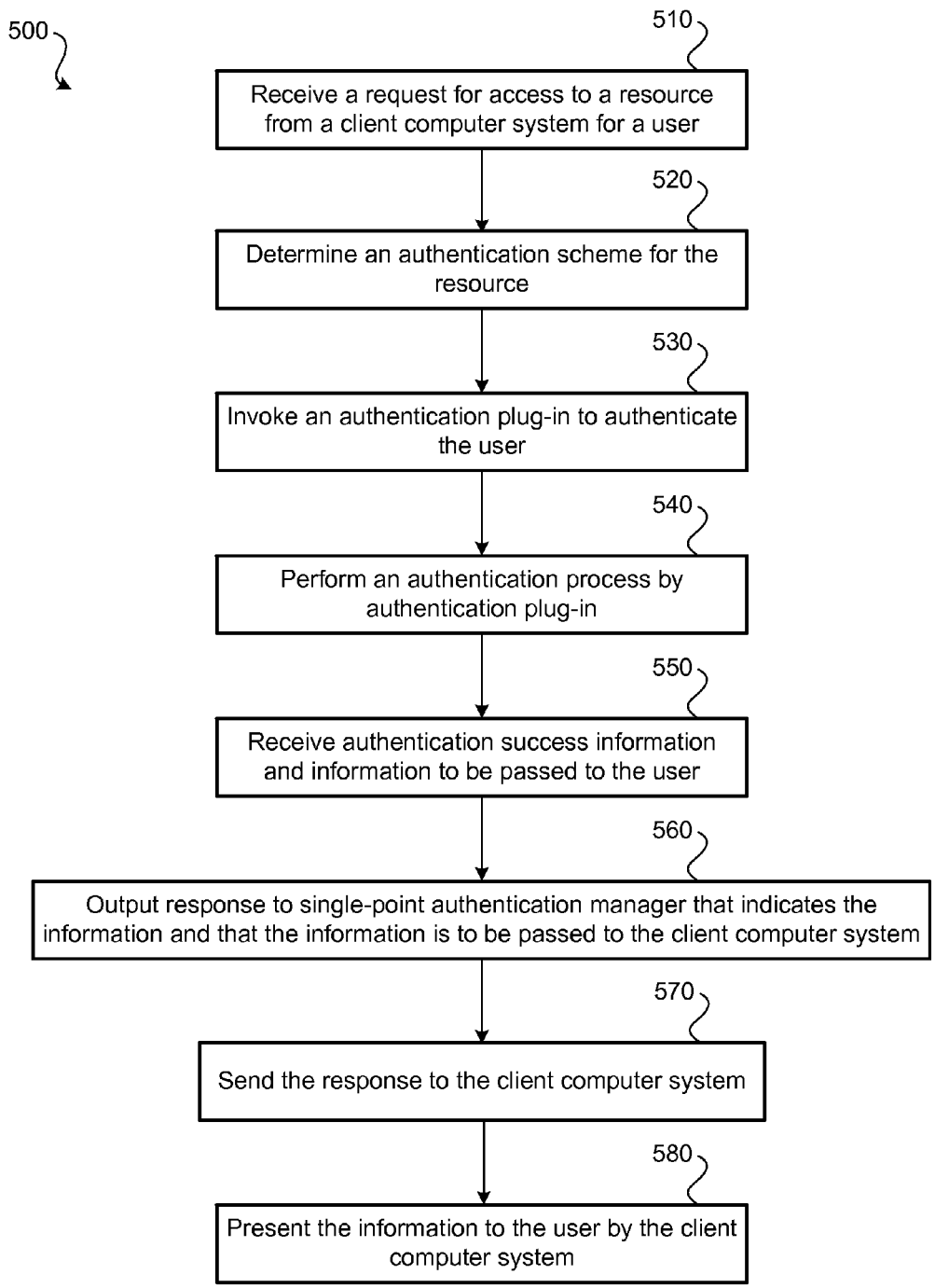
FIG. 5 illustrates another embodiment of a method for presenting authentication information to the user.

FIG. 5 illustrates an embodiment of a method 500 for presenting authentication information to the user following a successful authentication by the user. While authentication may be successful, there may be information to be provided by the authentication plug-in application to the user. Method 500 may be performed by system 100 of FIG. 1, system 300A of FIG. 3A, system 300B of FIG. 3B or some other system configured to perform single-point authentication information for the user. Means for performing method 500 include computer systems, such as computer system 700 of FIG. 7. More specifically, means for performing method 500 may include a client computer system, one or more networks, one or more single-point access manager computer systems, one or more computer systems executing an application, and/or one or more identity stores.

At step 510, a request for access to a resource, such as an application, may be received from a client computer system for a user. The request may be received by a single-point access manager. Such a single-point access manager may provide authentication services for one or more applications which are executed remotely from the client computer system being used by the user to access the resource. The request for access to the resource may include credentials submitted via a credential collector interface to a credential collector. The credential collector interface may be presented to the user via web browser. As an example of a credential collector interface, a webpage may be presented to the user that requests a username and password. Various forms of credentials that may be submitted by a user include, but are not limited to: a user name, a password, a biometric sample (e.g., a fingerprint, voiceprint, retina scan, etc.), a digital certificate, or other various types of information that may be used for authentication. Successful authentication may be required for the user to access the resource that the user has requested.

At step 520, it may be determined, such as by the single-point access manager, an authentication scheme (possibly selected from a plurality of authentication schemes) that is associated with the resource being requested by the user. Such a determination may be at least partially based on the request received at step 510 for access to the resource. Referring to FIG. 2, an authentication policy, such as authentication policy 230, may be associated with a particular resource (such as an application) of resources 225. Based on this authentication policy, various authentication modules, which may be authentication plug-in applications, may be invoked. Accordingly, for the resource requested at step 510, one or more particular authentication plug-in applications may be invoked to authenticate the user's access to the requested resource. In some embodiments, credentials are only requested from a user after the authentication scheme has been requested at step 520. In such embodiments, as part of step 520, data may be transmitted to the client computer system to request particular credentials from the user, such as a username and password, from the user. The requested credentials may be received by the single-point access manager from the user via the client computer system.

At step 530, at least one authentication plug-in application may be invoked for use in authenticating the user. Referring to system 100 of FIG. 1, an authentication plug-in application, such as authentication plug-in application 124-1, may be invoked by single-point access manager 122 which is being executed by single-point access manager computer system 120. Authentication plug-in application 124-1 may have been previous installed as a software component to add specific authentication abilities to the single-point authentication manager. Authentication of the credentials submitted by the user via credential collector interface 112 and client computer system 110 may be performed using authentication plug-in application 124-1. For example, authentication plug-in application 124-1 may be installed to handle a specific type of username and password authentication.

At step 540, the authentication plug-in application may perform authentication of the user using the credentials submitted by the user at either step 510 or step 520. The authentication plug-in application performing authentication may involve using an identity store API of the single-point access manager to retrieve stored identity information from either a local or remote identity store for comparison with the received credentials. For example, if the credentials submitted by the user via a credential collector interface and credential collector are a username and password, a stored password associated with the username may be retrieved from the identity store for comparison with the password received from the user. For the purposes of method 500, it is assumed that authentication by the authentication plug-in application is successful. As such, for example, the username submitted by the user is present within the identity store and is also associated with a stored password that matches a password submitted by the user. Following successful authentication, the application (or other form of resource) requested by the user may be executed and provided to the user, such as via a web browser being executed at the client computer system.

At step 560, the authentication plug-in application through which authentication succeeded may generate authentication information that is to be passed to the user. Such information may be useful to the user in order to maintain the user's account and/or provide the user with information regarding access to the resources. The authentication information generated at step 550 may indicate information about the user's account. By way of example only, sample authentication information may be a string of text that states: "Your password will expire in 14 days, please create a new one to prevent your account from being locked. Contact 978.555.2727 with any questions." The authentication information provided by the authentication plug-in application may be customized for the authentication plug-in application and/or the business entity on whose behalf the authentication plug-in application is being executed. The authentication information generated at step 550 may be in the format of <name=value>. The parameter may be "plugin_client_response." As such, referring back to the previous example, a request parameter such as PLUGIN_CLIENT_RESPONSE="Your password will expire in 14 days, please create a new one to prevent your account from being locked. Contact 978.555.2727 with any questions" may be generated by the authentication plug-in application. At step 560, the parameter generated at step 550 may be output by the authentication plug-in application to the single-point access manager. Referring to system 100 of FIG. 1, for example, authentication plug-in application 124-1 may pass a request parameter of "plugin_client_response" to single-point access manager 122 for output to application interface 114 of client computer system 110.

At step 570, the single-point access manager may receive the request parameter from the authentication plug-in application. Based on the name of the request parameter, such as "plugin_client_response," the single-point access manager may perform little or no processing on the request parameter. Rather, the single-point access manager may be configured such that based on the name of the request parameter, the request parameter is passed to the application interface (such as via the application interface) presented by the client computer system. Information in the request parameter may be sent to the application interface at the client computer system in an HTTP header. Accordingly, by an authentication plug-in application using such a request parameter, information may be passed from the authentication plug-in application to a user, via an application interface that is being executed at the client computer system following successful authentication. Therefore, at step 570, the request parameter may be transmitted by the single-point access manager to the application interface being executed at the client computer system as an HTTP header for display or for some other form of presentation to the user.

At step 580, the content of the request parameter, such as the value, may be presented by the application interface to the user at the client computer system. The request parameter may be displayed within the same web browser window as the application or a different web browser window. By presenting the value of the request parameter received as an HTTP header, the user may be able to view the information output by the authentication plug-in application. As such, referring to the previous example, the user may see the message: "Your password will expire in 14 days, please create a new one to prevent your account from being locked. Contact 978.555.2727 with any questions." If the application interface is presented by the client computer system using a web browser, the web browser may be used to present the information contained within the request parameter generated by the authentication plug-in application.

Figure 6:
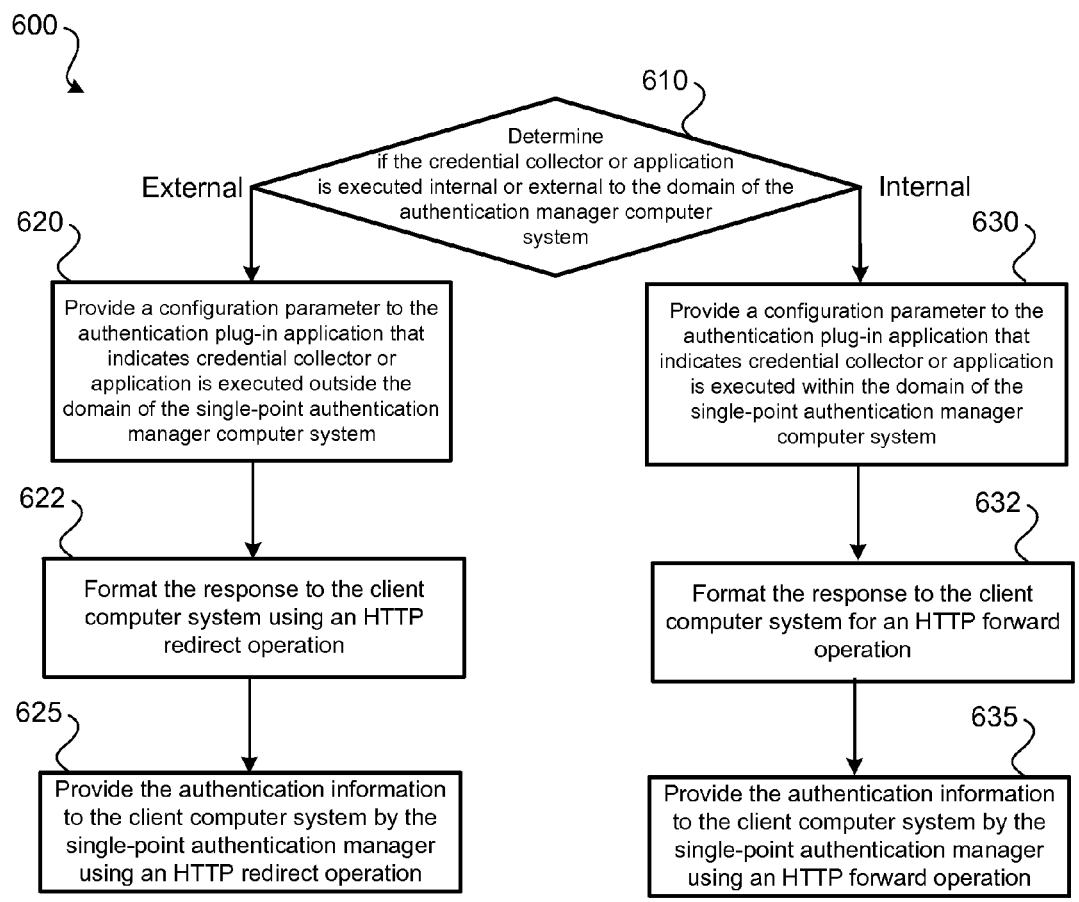
FIG. 6 illustrates an embodiment of a method for forwarding or redirecting authentication information to the user.

Depending on the environment of the client computer system being used by the user, an HTTP forward request or an HTTP redirect request may be desirable to transmit authentication information generated by the authentication plug-in application. A single authentication plug-in application may be able to use both HTTP forward requests and HTTP redirect requests based on a configuration parameter that may be set by the single-point access manager. As such, based on the environment of the credential collector or application, such as whether it is within the same domain of the single-point access manager computer system or not. Whether an HTTP forward or redirect is to be used for transmitting data from the single-point access manager to the client computer system, via the credential collector or application, may be determined. FIG. 6 illustrates an embodiment of a method for forwarding or redirecting authentication information to the user. Method 600 may be performed by system 100 of FIG. 1, system 300A of FIG. 3A, system 300B of FIG. 3B or some other system configured to perform single-point authentication information for the user. Means for performing method 600 include computer systems, such as computer system 700 of FIG. 7. More specifically, means for performing method 600 may include a client computer system, one or more networks, one or more single-point access manager computer systems, and/or one or more identity stores. Method 600 may be performed as part of method 400 or method 500 of FIGS. 4 and 5, respectively.

At step 610, a determination may be made as to the environment of the credential collector or application being executed. The determination may be made by the single-point access manager. The two environments that may be identified during the determination of step 610 may be whether the credential collector or application is within the same domain as the single-point access manager computer system or outside of the domain of the single-point access manager computer system. Referring to FIG. 3A, the credential collector is outside of the domain of the single-point access manager computer system. As an example of when this may occur, a credential collector may be executed by a separate computer system. Accordingly, the credential collector is in a separate domain from the single-point access manager computer system. Referring to FIG. 3B, the credential collector is within the same domain as the single-point access manager computer system. As an example of when this may occur, a credential collector may be executed by the single-point access manager computer system. In such an arrangement, the credential collector may be considered within the same domain as the single-point access manager computer system. The determination of whether a credential collector or application is within the same domain or outside the domain of the single-point access manager computer system may be based on IP address of the credential collector or application. The determination of step 610 may be performed by a single-point access manager.

If the environment of the credential collector or application is determined to be external to the domain of the single-point access manager computer system, method 600 may proceed to step 620. At step 620, a configuration parameter may be passed by the single-point access manager to the authentication plug-in application that indicates the credential collector or application is external to the domain of the single-point access manager computer system. At least partially based on this configuration parameter, at step 622 the response to the client computer system may be formatted to be sent, via the credential collector or application, using an HTTP redirect operation.

At step 625, authentication information or authentication failure information may be sent to the client computer system by the single-point access manager using an HTTP redirect via the credential collector or application. As such, the request parameter output by the authentication plug-in application may be output in the form of an HTTP redirect for transmission to the client computer system via the credential collector or application. The HTTP redirect may require the client computer system to request a new URL, which may contain the authentication information that is to be provided to the user. As such, the authentication information output by the authentication plug-in application to the single-point access manager may not be presented to the user until the browser of the client computer system loads a new URL provided as part of an HTTP redirect request sent by the single-point access manager to the client computer system.

If the environment of the credential collector or application is determined to be internal to the domain of the single-point access manager computer system, method 600 may proceed to step 630. At step 630, a configuration parameter may be passed by the single-point access manager to the authentication plug-in application that indicates the credential collector or application is executed internal to the domain of the single-point access manager computer system. At least partially based on this configuration parameter, at step 623 the response to the client computer system may be formatted to be sent using an HTTP forward operation.

At step 635, authentication information or authentication failure information may be sent to the client computer system by the single-point access manager using an HTTP forward via the credential collector or application. As such, the request parameter output by the authentication plug-in application may be output in the form of an HTTP forward for transmission to the client computer system via the credential collector or application. Accordingly, the URL loaded by a web browser of the client may not change, but information to be displayed or otherwise presented to the user by the web browser may be sent to the client computer system by the single-point access manager.

Figure 7:
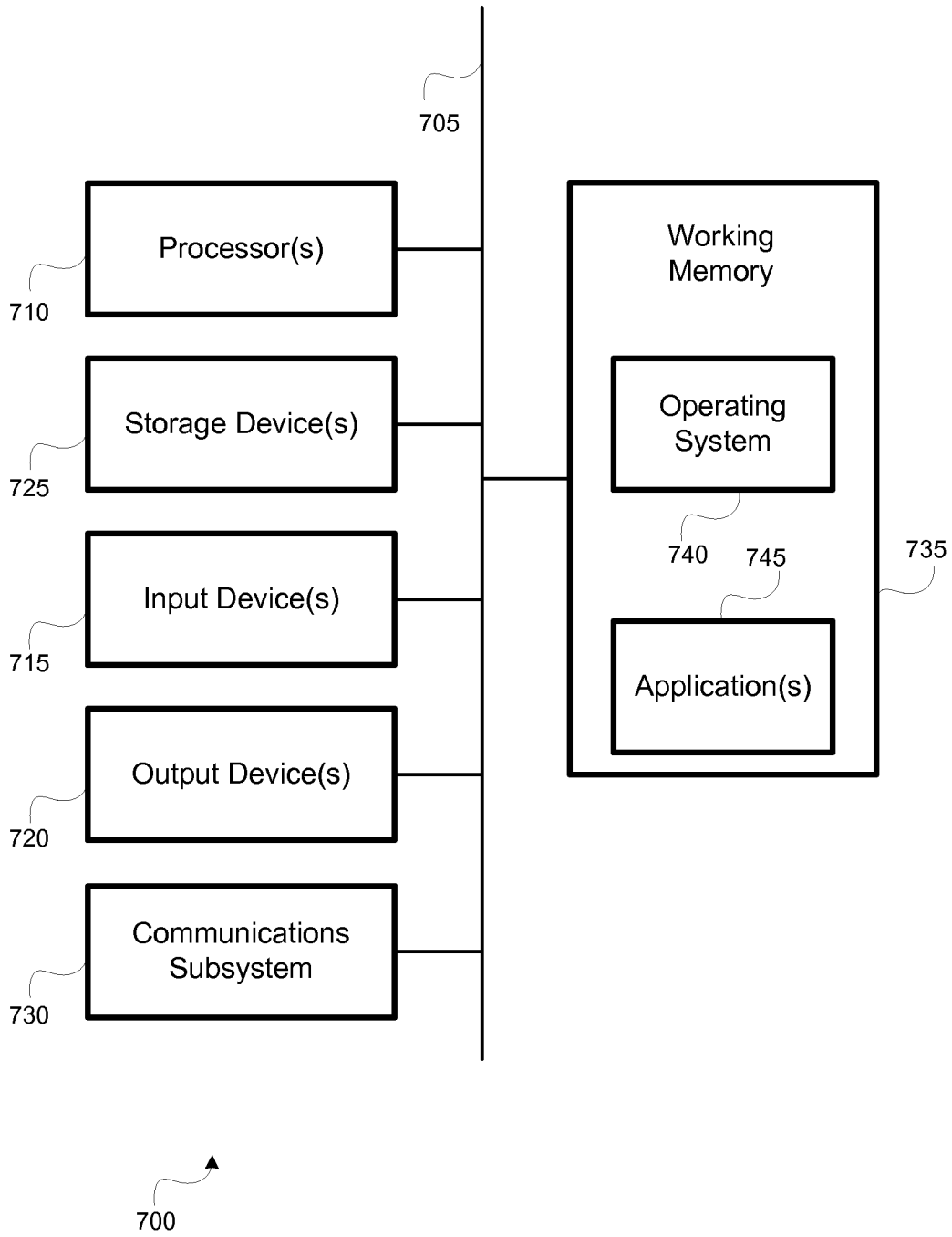
FIG. 7 illustrates an embodiment of a computer system.

FIG. 7 illustrates an embodiment of a computer system. A computer system as illustrated in FIG. 7 may be incorporated as part of the previously described computerized devices. For example, computer system 700 can represent at least some of the components of the client computer systems and single-point access managers computer systems. FIG. 7 provides a schematic illustration of one embodiment of a computer system 700 that can perform the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for providing authentication information to a user, the method comprising:
   receiving, by a single-point authentication manager executed by a computer system, a request to access a resource from a remote client computer system, wherein:
      the single-point authentication manager manages access to a plurality of resources including the resource; and
      the single-point authentication manager communicates with an authentication plug-in application that performs a type of authentication;
   performing, by the authentication plug-in application, authentication of the user;
   in response to performing authentication of the user, creating, by the authentication plug-in application, a message to be transmitted to the remote client computer system, the message comprising:
      an indication that the message is to be passed to the remote client computer system; and
      information regarding the authentication of the user;
   determining, by the authentication plug-in application, a credential collector is in communication with the single-point authentication manager from within a single domain; and
   in response to receiving the message from the authentication plug-in application and based on determining the credential collector is communicating with the single-point authentication manager from within the single domain, transmitting the message to the remote client computer system via the credential collector using an http forward operation.

2. The method for providing authentication information to the user of claim 1, wherein the information regarding the authentication of the user includes status information of an authentication process, wherein the authentication process failed.

3. The method for providing authentication information to the user of claim 1, wherein the information regarding the authentication of the user includes status information about an authentication process, wherein the authentication process is successful.

4. The method for providing authentication information to the user of claim 3, further comprising:
   executing the resource remote from the remote client computer system.

5. A method for providing authentication information to a user, the method comprising:
   receiving, by a single-point authentication manager executed by a computer system, a request to access a resource from a remote client computer system, wherein:

the single-point authentication manager manages access to a plurality of resources including the resource; and
the single-point authentication manager communicates with an authentication plug-in application that performs a type of authentication;
performing, by the authentication plug-in application, authentication of the user;
in response to performing authentication of the user, creating, by the authentication plug-in application, a message to be transmitted to the remote client computer system, the message comprising:
an indication that the message is to be passed to the remote client computer system; and
information regarding the authentication of the user;
determining, by the authentication plug-in application, a credential collector is communicating with the single-point authentication manager from a separate domain; and
in response to receiving the message from the authentication plug-in application and based on determining the credential collector is communicating with the single-point authentication manager from the separate domain, transmitting the message to the remote client computer system via the credential collector using an http redirect operation.

6. The method for providing authentication information to the user of claim 1, further comprising:
determining, by the single-point authentication manager executed by the computer system, the authentication plug-in application is to be used to authenticate the request received from a client.

7. The method for providing authentication information to the user of claim 1, wherein the message is presented to the user via a web browser at the remote client computer system.

8. A computer program product residing on a non-transitory computer-readable medium for providing authentication information to a user, the computer program product comprising computer-readable instructions configured to cause a computer to:
receive a request to access a resource from a remote client computer system, wherein
the computer program product comprises a single-point authentication manager that receives the request manages access to a plurality of resources including the resource; and
the single-point authentication manager communicates with an authentication plug-in application that performs a type of authentication;
perform, using the authentication plug-in application, authentication of the user;
in response to performing authentication of the user, create, using the authentication plug-in application, a message to be transmitted to the remote client computer system, the message comprising:
an indication that the message is to be passed to the remote client computer system; and
information regarding the authentication of the user;
determine a credential collector is in communication with the single-point authentication manager from within a single domain; and
in response to receiving the message from the authentication plug-in application and based on determining the credential collector is communicating with the single-point authentication manager from within the single domain, cause the message to be transmitted to the remote client computer system via the credential collector using an http forward operation.

9. The computer program product for providing authentication information to the user of claim 8, wherein the information regarding the authentication of the user includes status information of an authentication process, wherein the authentication process failed.

10. The computer program product for providing authentication information to the user of claim 8, wherein the information regarding the authentication of the user includes status information about an authentication process, wherein the authentication process is successful.

11. A computer program product residing on a non-transitory computer-readable medium for providing authentication information to a user, the computer program product comprising computer-readable instructions configured to cause a computer to:
receive a request to access a resource from a remote client computer system, wherein
the computer program product comprises a single-point authentication manager that receives the request manages access to a plurality of resources including the resource; and
the single-point authentication manager communicates with an authentication plug-in application that performs a type of authentication;
perform, using the authentication plug-in application, authentication of the user;
in response to performing authentication of the user, create, using the authentication plug-in application, a message to be transmitted to the remote client computer system, the message comprising:
an indication that the message is to be passed to the remote client computer system; and
information regarding the authentication of the user;
determine a credential collector is communicating with the single-point authentication manager from a separate domain; and
in response to receiving the message from the authentication plug-in application and based on determining the credential collector is communicating with the single-point authentication manager from the separate domain, cause the message to be transmitted to the remote client computer system via the credential collector using an http redirect operation.

12. The computer program product for providing authentication information to the user of claim 8, the computer program product further comprising computer-readable instructions configured to cause the computer to:
determine the authentication plug-in application is to be used to authenticate the request received from a client.

13. The computer program product for providing authentication information to the user of claim 8, wherein the message is presented to the user via a web browser at the remote client computer system.

14. A system for providing authentication information to a user, the system comprising:
a single-point authentication computer system comprising:
a processor; and
a memory communicatively coupled with and readable by the processor and having stored therein processor-readable instructions which, when executed by the processor, cause the processor to:
receive, by a single-point authentication manager executed by the single-point authentication computer system, a request to access a resource from a remote client computer system, wherein:

the single-point authentication manager manages access to a plurality of resources including the resource; and the single-point authentication manager communicates with an authentication plug-in application that performs a type of authentication;

perform, by the authentication plug-in application, authentication of the user;

in response to performing authentication of the user, create, by the authentication plug-in application, a message to be transmitted to the remote client computer system, the message comprising:

an indication that the message is to be passed to the remote client computer system; and information regarding the authentication of the user;

determine a credential collector is in communication with the single-point authentication manager from within a single domain; and in response to receiving the message from the authentication plug-in application and based on determining the credential collector is communicating with the single-point authentication manager from within the single domain, cause the message to be transmitted to the remote client computer system via the credential collector using an http forward operation.

15. The system for providing authentication information to the user of claim 14, wherein the information regarding the authentication of the user includes status information of an authentication process, wherein the authentication process failed.

16. The system for providing authentication information to the user of claim 14, wherein the information regarding the authentication of the user includes status information about an authentication process, wherein the authentication process is successful.

17. A system for providing authentication information to a user, the system comprising:

a single-point authentication computer system comprising:
  a processor; and
  a memory communicatively coupled with and readable by the processor and having stored therein processor-readable instructions which, when executed by the processor, cause the processor to:
    receive, by a single-point authentication manager executed by the single-point authentication computer system, a request to access a resource from a remote client computer system, wherein:
      the single-point authentication manager manages access to a plurality of resources including the resource; and
      the single-point authentication manager communicates with an authentication plug-in application that performs a type of authentication;
    perform, by the authentication plug-in application, authentication of the user;
    in response to performing authentication of the user, create, by the authentication plug-in application, a message to be transmitted to the remote client computer system, the message comprising:
      an indication that the message is to be passed to the remote client computer system; and
      information regarding the authentication of the user;
  determine a credential collector is communicating with the single-point authentication manager from a separate domain; and
  in response to receiving the message from the authentication plug-in application and based on determining the credential collector is communicating with the single-point authentication manager from the separate domain, cause the message to be transmitted to the remote client computer system via the credential collector and an http redirect operation.

* * * * *

UNITED STATES PATENT AND TRADEMARK OFFICE
CERTIFICATE OF CORRECTION

| | | |
|---|---|---|
| PATENT NO. | : 8,925,050 B2 | Page 1 of 2 |
| APPLICATION NO. | : 13/663189 | |
| DATED | : December 30, 2014 | |
| INVENTOR(S) | : Aarathi Balakrishnan et al. | |

It is certified that error appears in the above-identified patent and that said Letters Patent is hereby corrected as shown below:

In The Specification

Column 1, Line 63
　　Replace "...an http forward..." with -- an HTTP forward --

Column 2, Line 4
　　Replace "...an http redirect..." with -- an HTTP redirect --

Column 2, Line 53
　　Replace "...an http forward..." with -- an HTTP forward --

Column 2, Line 62
　　Replace "...an http redirect..." with -- an HTTP redirect --

Column 3, Line 50
　　Replace "...an http forward..." with -- an HTTP forward --

Column 3, Line 59
　　Replace "...an http redirect..." with -- an HTTP redirect --

Column 20, Lines 46-47
　　Replace "...an http forward..." with -- an HTTP forward --

Column 21, Line 24
　　Replace "...an http redirect..." with -- an HTTP redirect --

Column 21, Line 67
　　Replace "...an http forward..." with -- an HTTP forward --

Signed and Sealed this
Seventeenth Day of May, 2016

Michelle K. Lee
*Director of the United States Patent and Trademark Office*

CERTIFICATE OF CORRECTION (continued)
U.S. Pat. No. 8,925,050 B2

Column 22, Lines 44-45
  Replace "...an http redirect..." with -- an HTTP redirect --

Column 23, Line 26
  Replace "...an http forward..." with -- an HTTP forward --

Column 24, Lines 37-38
  Replace "...an http redirect..." with -- an HTTP redirect --